(12) United States Patent
Schneider

(10) Patent No.: US 8,812,570 B2
(45) Date of Patent: Aug. 19, 2014

(54) STRING HASHING USING A NUMBER GENERATOR

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1054 days.

(21) Appl. No.: 12/473,939

(22) Filed: May 28, 2009

(65) Prior Publication Data

US 2010/0306294 A1    Dec. 2, 2010

(51) Int. Cl.
*G06F 7/58* (2006.01)
(52) U.S. Cl.
USPC .......................................................... 708/250
(58) Field of Classification Search
USPC .......................................................... 708/250
See application file for complete search history.

(56) References Cited

U.S. PATENT DOCUMENTS

| 5,442,699 | A  | * | 8/1995  | Arnold et al. ................. 713/188 |
| 5,625,693 | A  | * | 4/1997  | Rohatgi et al. ................ 713/187 |
| 5,991,898 | A  | * | 11/1999 | Rajski et al. .................... 714/30 |
| 6,122,375 | A  | * | 9/2000  | Takaragi et al. ................ 380/28 |
| 7,174,013 | B1 | * | 2/2007  | Patel et al. ....................... 380/28 |
| 2001/0038693 | A1 | * | 11/2001 | Luyster ........................... 380/37 |

* cited by examiner

*Primary Examiner* — Lewis A Bullock, Jr.
*Assistant Examiner* — Viva Miller
(74) *Attorney, Agent, or Firm* — Lowenstein Sandler LLP

(57) ABSTRACT

In one embodiment, a mechanism for string hashing using a random number generator is disclosed. In one embodiment, a method includes dividing an input stream provided to a hashing module into a plurality of subsets of 'n' bits, entangling, by a mixer of the hashing module, one of the subsets of 'n' bits by a next sequential output of a pseudo-random number generator (PRNG), adding a product of the entangling to an accumulator of the hashing module, repeating the entangling and adding until all subsets of the plurality of subsets have been processed, and returning a value in the accumulator as a hash result value.

15 Claims, 4 Drawing Sheets

STRING HASHING USING A NUMBER GENERATOR

TECHNICAL FIELD

The embodiments of the invention relate generally to hash functions and, more specifically, relate to string hashing using a random number generator.

BACKGROUND

A hash function is a well-defined procedure that converts a large, possibly variable-sized, amount of data into a small datum that may serve as an index into an array. Hash functions are used to speed up table lookup or data comparison tasks, such as finding items in a database, detecting duplicate or similar records in a large file, and so on.

One problem encountered with hash functions is collisions. Collisions occur when two different data inputs to a hash function result in the same hash value. With many common data hashing functions, two similar (but not identical) data inputs will have a high probability of hash value collision. For example, the two input strings, "cat" and "hat", may have a higher probability of hash value collision for most common hash functions. In other words, the distribution of hash values in the space of possible hash value results is not uniformly distributed in the case of most common hash functions.

Such an uneven distribution of hash values can be problematic because the existence of similar strings in a data input to a hash function frequently occurs in practice. Consequently, reducing the probability of collisions with a hash function will result in a more efficient and better-performing hash table. A hash function where the probability of collision for any two input strings is the same, regardless of the content of the strings, would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
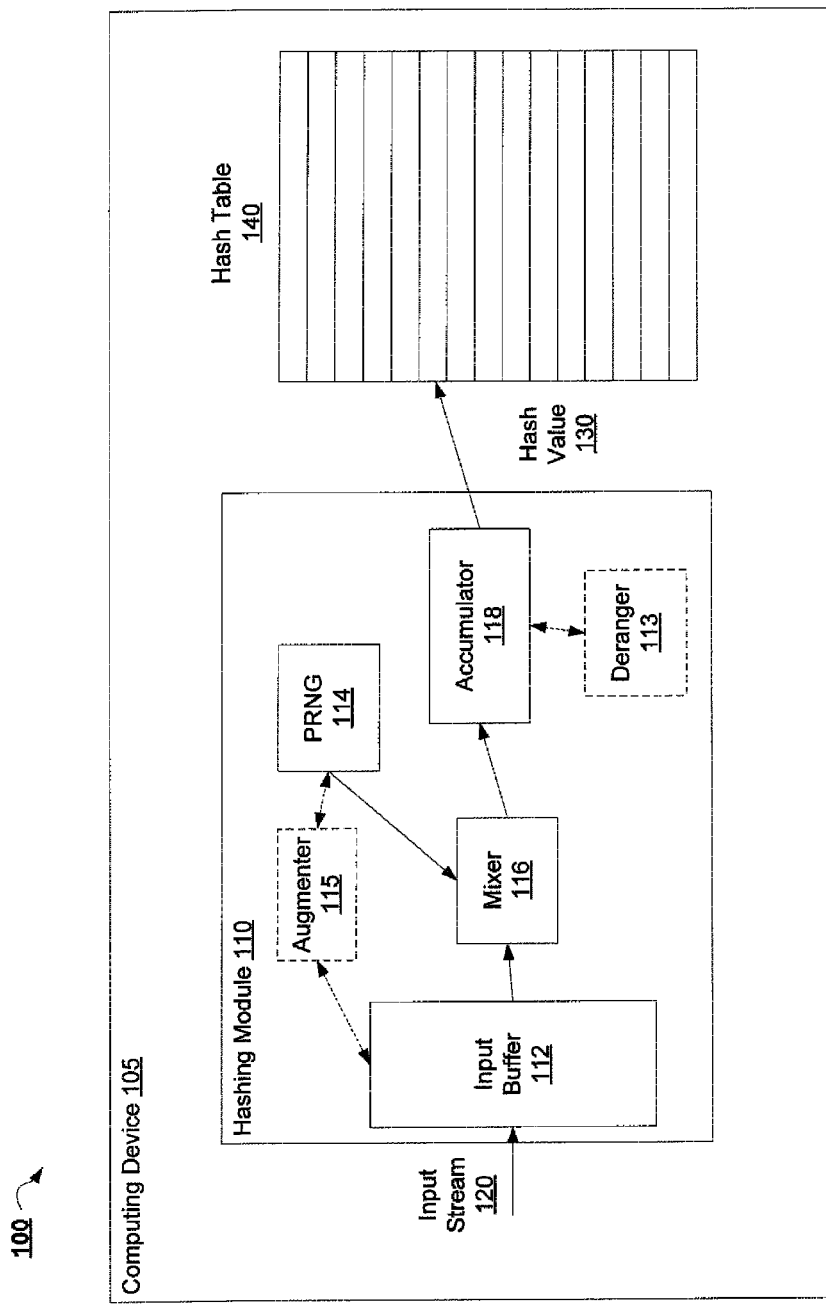
FIG. 1 is a block diagram of a system that performs a string hashing function using a pseudo-random number generator according to an embodiment of the invention.

Embodiments of the invention provide for string hashing using a random number generator. In one embodiment, a method of string hashing using a random number generator includes dividing an input stream provided to a hashing module into a plurality of subsets of 'n' bits, entangling, by a mixer of the hashing module, one of the subsets of 'n' bits by a next sequential output of a pseudo-random number generator (PRNG), adding a product of the entangling to an accumulator of the hashing module, repeating the entangling and adding until all subsets of the plurality of subsets have been processed, and returning a value in the accumulator as a hash result value.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide for string hashing using a pseudo-random number generator (PRNG). In one embodiment, the string hashing function of embodiments of the invention processes an input stream in overlapping collections of 'n' bits, where 'n' is the output size of the hash result. Each collection of 'n' bits is entangled with a state of a PRNG of the same size. This construction provides for a collision-resistant hashing function.

FIG. 1 is a block diagram of a system 100 that performs a string hashing function using a PRNG according to an embodiment of the invention. In one embodiment, system 100 may be implemented by any computing device 105 having a processor and a memory. For example, computing device 105 may include a client or a server computer system. In one embodiment, computing device 105 may be a server computer system that is used as a search engine server. In another embodiment, computing device 105 may be a server computer system that is used as a database server, such as a lightweight directory access protocol (LDAP) server. In yet another embodiment, computing device 105 may be a client computer system utilizing improved data lookup algorithms.

The computing device 105 of system 100 includes a hashing module 110 and a hash table 140. Hashing module 110 receives an input data stream 120 and performs a hashing function on the input data stream. In one embodiment, if computing device 105 is a server computer system, then input stream 105 may be received from a client computer system. Conversely, if computing device 105 is a client computer system, then input stream 105 may be received from a server computer system.

In some embodiments, system 100 is well-suited for table lookup and data comparison tasks by a computing device. For example, as a result of the hashing function performed by hashing module 110, a hash value 130 is generated and output by hashing module 110 to hash table 140. In some embodiments, hash table 140 uses hash value 130 as an index in the table 140 referencing a pointer value for speedy data lookup or comparisons, such as locating a data record, finding duplicate records, and finding similar records. In other embodiments, the hash result 130 from hashing module 110 may be utilized for cryptographic functions in information security.

Embodiments of the invention focus on a hashing function performed by hashing module 110. Hashing module 110 includes many components to assist in performing the hashing function including, but not limited to, an input buffer 112, a pseudo-random number generator (PRNG) 114, a mixer 116, and an accumulator 118. In addition, hashing module 110 may include one or both of a deranger 113 and an augmenter 115.

In one embodiment, input buffer 112 processes the input stream 120 in collections of 'n' bits, where 'n' is the output hash size. In some embodiments, 'n' may be a multiple of eight for easier byte calculations. In one embodiment, the input stream 120 is processed by input buffer 112 in overlapping collections of 'n' bits for the hashing function. The overlapping collections are assembled by starting at the first bit, assembling 'n' bits into a binary integer, processing that integer, and advancing forward in the input stream 120 by a predetermined amount of bits (e.g., eight bits). This process is repeated until all bits in the input stream 120 have been processed, stopping either at the last 'n' bits of the input stream or at whatever predetermined amount of bits the input stream is advanced by.

Processing the input stream 120 in overlapping collections promotes stronger ordering dependency in the input stream in relation to the hash function. In this way, each bit of the input stream affects the hash function in multiple iterations and influences the amount of change that gets registered for a single bit change in the input string (i.e., if each bit gets used three times, it will have three chances to affect the output of the hash function). Embodiments of the invention envision that factors such as the size of the input stream to be operated on and the size of the hash result output are considered in determining the amount of overlap in the collections of the input stream being processed by the hash function.

In one embodiment, as part of the hash function of hashing module 110, each 'n' bit collection of the input stream 120 is entangled by the mixer 114 with a state of a PRNG 114 of the same size as part of the hashing function. By "entangling with the state of a PRNG", it is meant that the mixer 114 takes the next sequential n-bit value from the input buffer 112 and combines those bits with the next sequential output of the PRNG 116 in some fashion such that all of the bits of the n-bit quantity from the input buffer 112 and all of the bits from the PRNG 116 influence every bit of the output.

In one embodiment, this is accomplished by integer multiplication modulo $2^n +/- 1$. This can be accomplished in assembly language assuming there is an n-bit integer multiple instruction that produces two n-bit results. Then, the higher order n-bit value is just added or subtracted from the lower-order n-bit value. In another embodiment, the entanglement involves integer multiplication modulo a prime less than $2^n$. In still another embodiment, the entanglement involves multiplication over $GF(p^n)$. For example, if the hashing module 110 is processing 24 bits at a time from the input buffer 112, the mixer 114 may perform multiplication over $GF(2^{24})$, which is a finite field that has a binary basis.

Between cycles of processing the input stream by the hashing function, the hashing module 110 may implement one or two options in embodiments of the invention. The first option is a derangement option. The second option is an augmentation option. Both of these options are described in further detail below.

The derangement and augmentation options prevent a zero-length input and an input consisting of entirely zero bits from producing the same hash value. The occurrence of null strings or an input sequence of zero bits could result in many unnecessary collisions, reducing the efficiency of the hashing module 110.

The derangement option utilizes the deranger 113 to derange the value stored in the accumulator 118 in a slight, but non-linear, fashion between each entangled n-bit value. The derangement may be as simple as multiplying the accumulator value 118 by a small value and adding another small value. Alternatively, the accumulator value 118 may be rotated by some amount, and a small constant value added.

The non-zero initialization of the accumulator 118 and derangement steps guard against collisions when the input to the hashing module 110 is null or consists of a string of zero bits.

If the first option of derangement is chosen, special care should be taken in the selection of the multiplier and the addition constant. These constant values should be suitable for a linear congruential PRNG of the same size as the hash value.

Alternatively, the second option of augmentation guards against producing zero entanglement results, which would cause all zero-bit strings of any length to have the same hash value. In some embodiments, the augmentation option also increases the number of bits that a low-order input bit can effect.

With the augmentation option, the hashing module 110 utilizes the augmenter 115. In this case, the input is processed in m-bit pieces (where m=n+b), the augmenter 115 augments the input m-bit value from the input buffer 112 with a constant first constant b bits (not all zero) to guarantee that the values are non-zero. Additionally, the PRNG 116 value is augmented in the same fashion with a second constant b bits. The non-zero initialization of the accumulator 118 and augmentation steps guard against collisions when the input to the hashing module 110 is null or consists of a string of zero bits.

When the entire input stream 120 has been processed by hashing module 110, the accumulator 118 outputs a hash value 130 to hash table 140. In some embodiment, hash table 140 may utilize the hash value 130 to speed up table lookup or data comparison tasks, for example.

In one embodiment, hashing module 110 may be utilized to implement a rolling hash. A rolling hash is a hash function where the input is hashed in a window that moves through the input. A rolling hash is particularly useful in making quick determinations whether or not two separate pieces of a data stream are different. It should be noted that the option of derangement should not be utilized for a rolling hash with embodiments of the invention.

To implement a rolling hash, the hashing module 110 should allocate a buffer (not shown) with a size of k*n bits to store the last 'k' of 'n'-bit entangled intermediate hash values (i.e., the entangled values from the mixer 116). At each step of the hashing function, the hashing module 110 subtracts the oldest intermediate result from the accumulator 118, calculates the next value in the mixer 116 (based on the input buffer value 112 and PRNG value 114), adds that value to the accumulator 118, and replaces the oldest entry in the buffer with this new result, repeating as needed.

Additionally, embodiments of the invention may be extended to cryptographic uses. For instance, the hashing module 110 may provide a 128-bit hash value, which is of the minimum size acceptable for cryptographic use. In order to ensure cryptographic strength of the hashing function, embodiments of the invention increase the ordering dependence in the hashing function by deranging the accumulator 118 between each addition step and by making the derangement step also be order dependent. For example, the derangement step may be made more order-dependent by rotating the hash value in the accumulator by the same number of bits as the current cycle (e.g., on the first cycle rotate to the left by 1 bit, on the second cycle rotate to the left by 2 bits, and so on).

In one embodiment intended for cryptographic usage, entanglement is accomplished by multiplication over a finite field of appropriate size. For example, with a 128-bit result, multiplication over $GF(257^{16})$ may be performed, and every 8 bits of the input stream should be considered to be an element of $GF(257)$, with the all-zero bit string representing the value 256. The primes 257 and 65,537 are ideal in this regard as they are very close to a useful power of two, and operations in the basis fields ($GF(257)$ and $GF(65537)$) are simple to implement using 8 and 16 bit multiply instructions. For implementations using a basis field of $GF(257)$, it is possible to represent basis field operations with a couple of lookup tables that take up no more than 64 kB of memory in total.

In addition, embodiments of the invention may also multiply the accumulator 118 by the output of a different PRNG (not shown) between each addition step to provide further cryptographic strength. Furthermore, order-dependent derangement and accumulator multiplication may be performed together in the same cycle, in either order, to enhance cryptographic strength.

Figure 2:
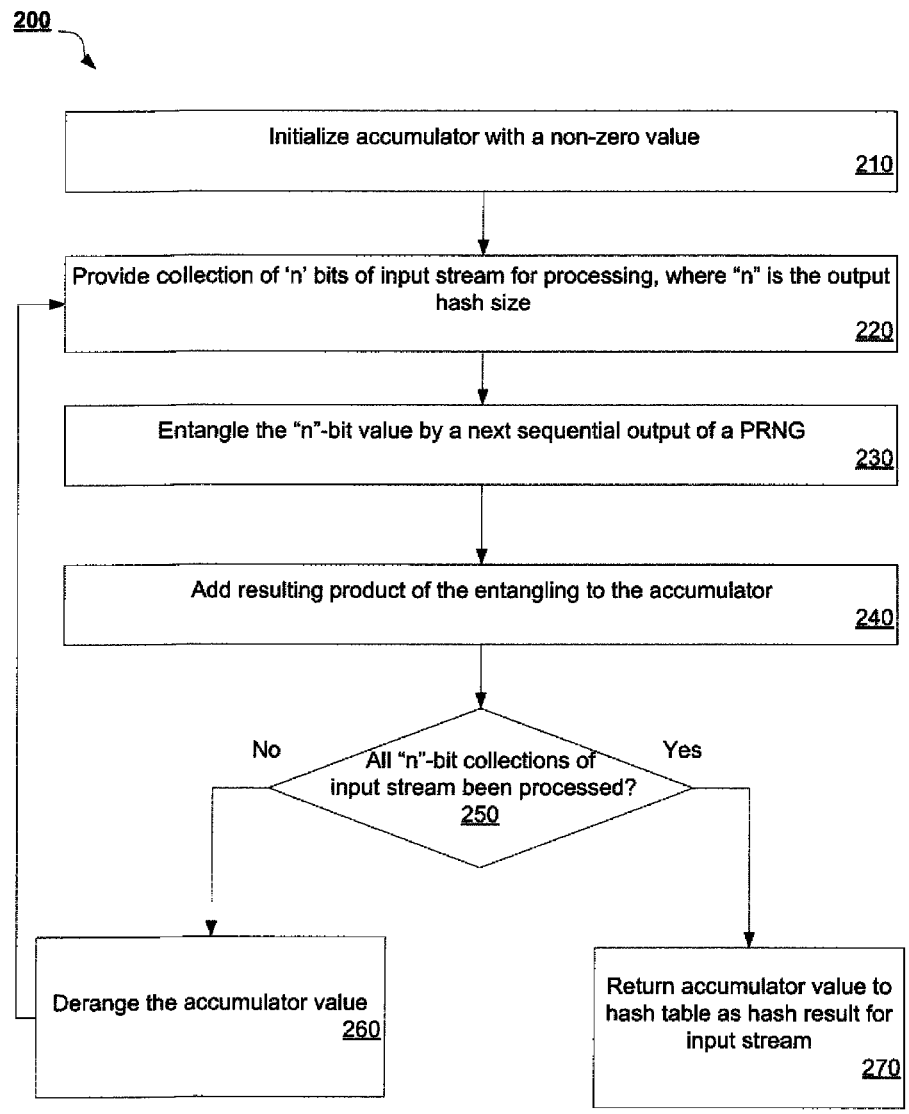
FIG. 2 is a flow diagram illustrating a method for string hashing with a pseudo-random number generator utilizing a derangement option according to an embodiment of the invention.

FIG. 2 is a flow diagram illustrating a method 200 for string hashing with a PRNG utilizing a derangement option according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by hashing module 110 of FIG. 1.

Method 200 begins at block 210 where an accumulator is initialized with a non-zero value. Then, at block 220, an input buffer provides a collection of 'n' bits of an input stream for hash function processing, where 'n' is the output hash value size. In one embodiment, the collection of 'n' bits overlaps with other input blocks from the input stream for processing.

At block 230, a mixer entangles the 'n'-bit value by a next sequential output of a PRNG. As discussed above, in embodiments of the invention, entangling means that the next sequential 'n'-bit value from the input buffer is combined with the next sequential output of the PRNG in some fashion such that all of the bits of the 'n'-bit quantity from the input buffer and all of the bits from the PRNG influence every bit of the output. The resulting product of the entanglement is added to the accumulator at block 240.

Subsequently, at block 250, it is determined whether all 'n'-bit collections of the input stream have been processed by the hash function. If not, then at block 260 the value in the accumulator is deranged. In one embodiment, deranging the accumulator value includes multiplying the accumulator value by a small value and adding another small value. Alternatively, the accumulator value may be rotated by some amount, and a small constant value added. In one embodiment, a deranger module may perform the derangement at block 260. Then, method 200 returns to block 220 to continue processing collections of 'n' bits of the input stream.

If, at block 250, all 'n'-bit collections of the input stream have been processed by the hashing function, then method 200 proceeds to block 270. At block 270, the accumulator value is returned to a hash table as the hash result for the input stream. In some embodiments, the hash table may utilize the hash result to speed up table lookup or data comparison tasks, for example.

Figure 3:
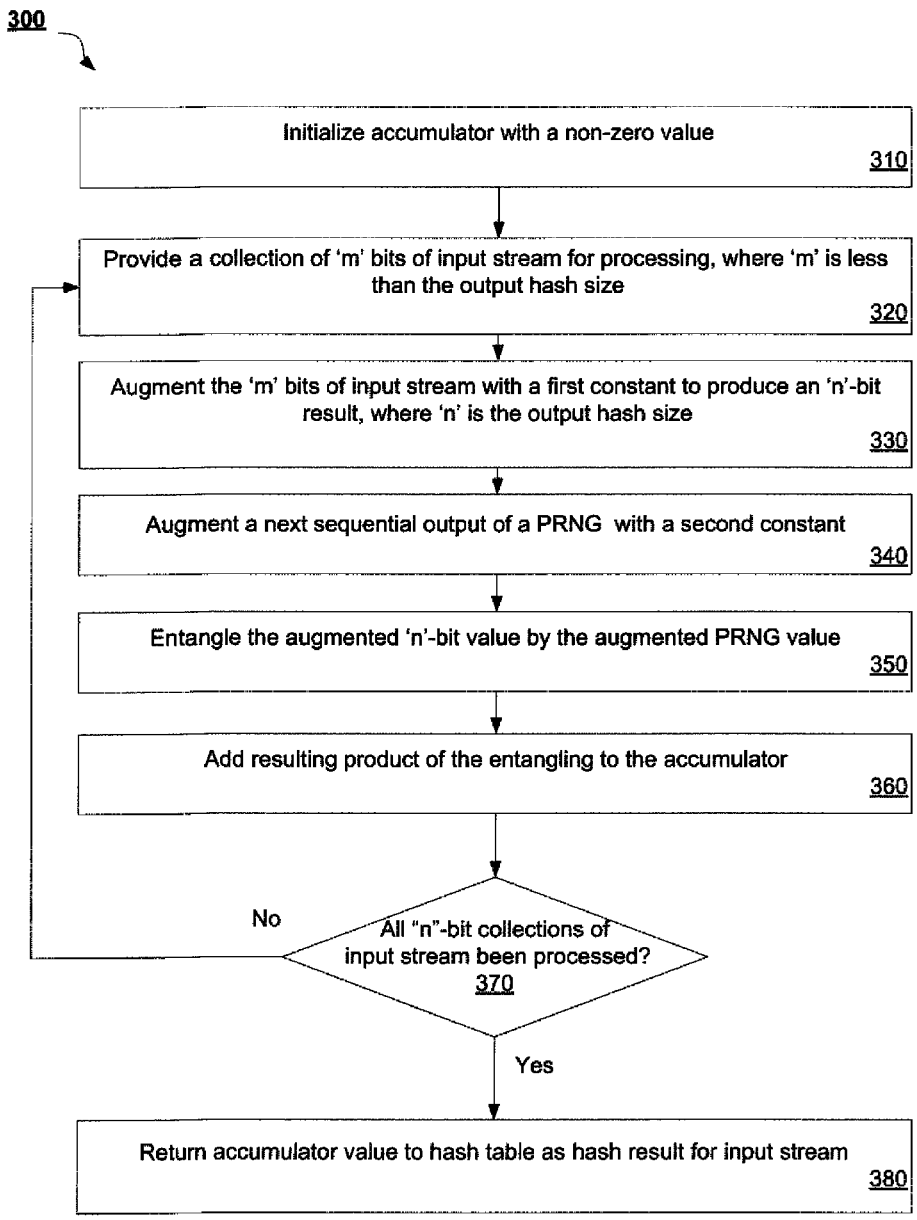
FIG. 3 is a flow diagram illustrating a method for string hashing with a pseudo-random number generator utilizing an augmentation option according to an embodiment of the invention.

FIG. 3 is a flow diagram illustrating a method 300 for string hashing with a PRNG utilizing an augmentation option according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by hashing module 110 of FIG. 1.

Method 300 begins at block 310 where an accumulator is initialized with a non-zero value. Then, at block 320, an input buffer provides a collection of 'm' bits of an input stream for hash function processing, where 'n' is the output hash value size, and 'm' is less than 'n'. In one embodiment, the collection of 'm' bits overlaps with other input blocks from the input stream for processing. At block 330, the 'm'-bits from the input buffer are augmented with a first constant of 'b' bits (where n=m+b). At block 340, a next sequential output of a PRNG is augmented with a second constant. In one embodiment, an augmenter may perform the augmentation of the 'm'-bit value and the PRNG value of blocks 330 and 340. In one embodiment, only block 330 is necessary to perform. However, in some embodiments, both of blocks 330 and 340 may be performed.

Subsequently, at block 350, a mixer entangles the augmented 'n'-bit value with the augmented PRNG value. The resulting product of the entanglement is added to the accumulator at block 360. At block 370, it is determined whether all of the 'n'-bit collections from the input stream have been processed by the hash function. If not, then method 300 returns to block 320 to continue processing collections of 'n' bits from the input stream for the hash function.

If, at block 370, all 'm'-bit collections of the input stream have been processed by the hashing function, then method 300 proceeds to block 380. At block 380, the accumulator value is returned to a hash table as the hash result for the input stream. In some embodiments, the hash table may utilize the hash result to speed up table lookup or data comparison tasks, for example.

The following is an example of the hash function of method 300 applied to two strings: "he fries eggs" and "he fried eggs". Corresponding block numbers to method 300 are indicated in brackets throughout the example. Assume that the PRNG in the example is defined by the recurrence relation $X_i+1=1664525*X_i+1013904223$ (modulo $2^{32}$) (the constants are 0x19660d and 0x3c6ef35f, respectively, expressed as hexadecimal).

For the purposes of this example, entanglement will be multiplication modulo $2^{32}$. This is not a preferred embodiment, but is chosen for simplicity. Multiplication modulo $2^{32}$ does not produce a result where all of the output bits depend on all of the input bits.

Take the high-order 24 bits from the PRNG, plus an additional 8-bit quantity of 165 (0xa5) as the low-order 8 bits. The strings are processed in overlapping 24-bit quantities, also augmented with a low-order byte of 165. Assume the starting accumulator value is 3141592653 (0xbb40e64d) [block 310], and the initial seed for the PRNG is 589793238 (0x232787d6).

For the first string ("he fries eggs"), the first 24 bit value (as hex) is 0x686520 [block 320], which is augmented to 0x686520a5 [block 330]. The first value produced by the PRNG is 0x09761d, which is augmented to 0x09761da5 [block 340]. Multiplication of these two values produces 0x96eebb59 [block 350], which is added to the accumulator value (0xbb40e64d) to produce 0x522fa1a6 [block 360].

At the next cycle [block 370], the 24 bit value 0x652066 (from the input string) is augmented to 0x652066a5, which is multiplied by 0xa209bda5, resulting in 0x1f76f959, which is added to the accumulator to give the value 0x71a69aff. Continuing in this fashion, the final value from the string is 730000a5 (this is the final byte, padded with two trailing zeros, then augmented with 0xa5), which is multiplied by the augmented PRNG value 0x1f1705a5. The final hash value is 0xadb553d2 [block 380].

The result for hashing the second string begins the same, but at the $8^{th}$ cycle, the values are different, and the ultimate result is 0x402ca8d2. As shown, the hash function 300 of embodiments of the invention, as applied to these two very similar strings, results in much different hash values. The original strings only had a 4 bit difference (out of 104 bits). However, the final hash results had a 19-bit difference (out of 32 bits). The 19-bit difference caused by the initial 4-bit difference exemplifies how embodiments of the invention reduce the probability of hash result collisions.

Figure 4:
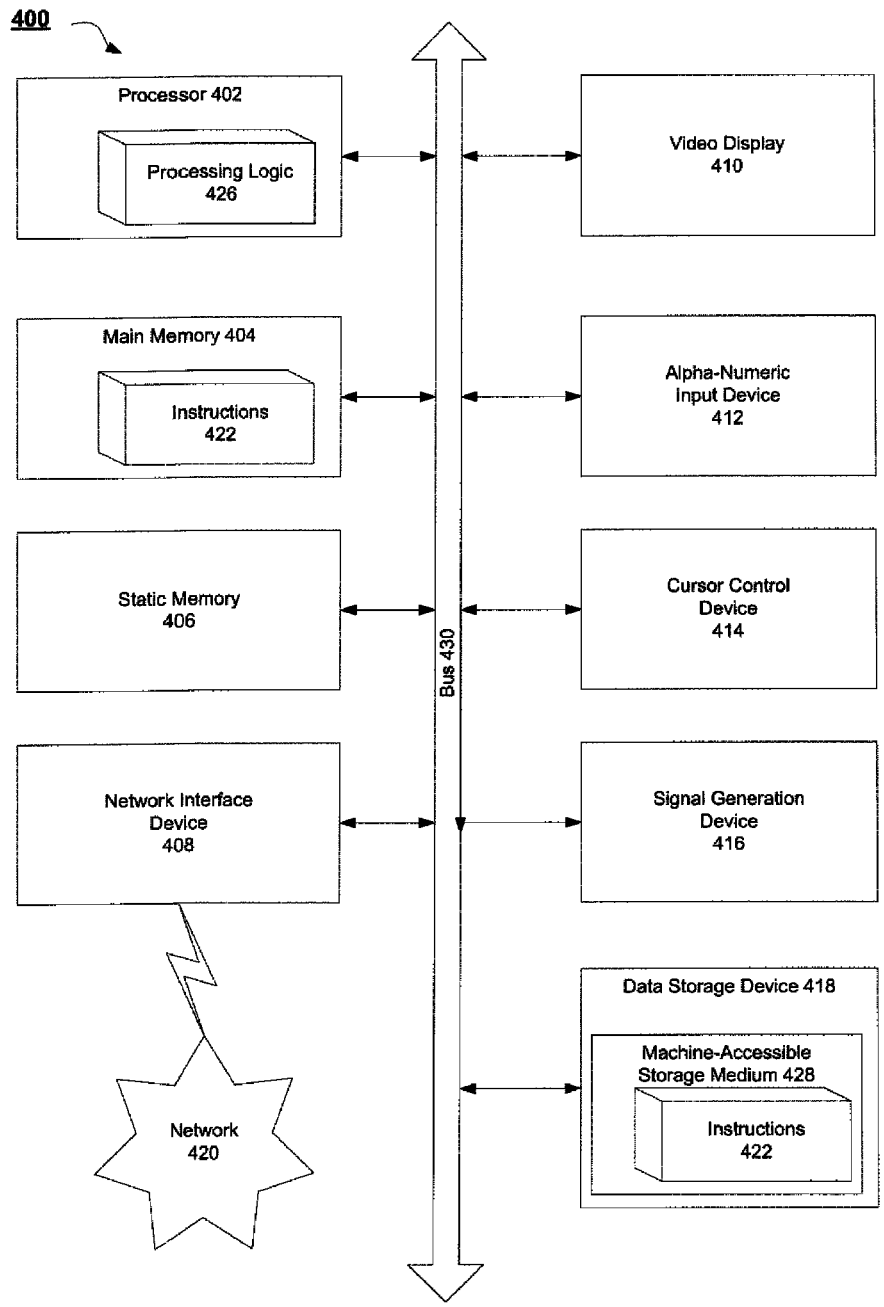
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform methods 200 and 300 to provide a string hash function using a PRNG as described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
dividing, by a hashing module executed by a processing device, an input stream into subsets of bits, wherein each subset comprises a same number of bits and wherein one or more of the subsets of bits of the input stream comprises an overlapping subset;
entangling, by a mixer of the hashing module, a subset of the subsets of bits by a next sequential output of a number generator, wherein the entangling comprises multiplication of the subset by the next sequential output of the number generator;
adding a product of the entangling to an accumulator of the hashing module;
deranging current data in the accumulator, the deranging comprising augmenting the current data to be non-linear by applying functions to the current data utilizing constant values;
repeating, by the hashing module, the entangling, the adding, and the deranging on at least a portion of a next sequential subset of the subsets of bits until all of the subsets of bits have been processed; and
when all of the subsets of bits have been processed, returning data in the accumulator as a hash result value.

2. The method of claim 1, wherein deranging the data in the accumulator comprises multiplying the data in the accumulator by a first constant and adding a second constant to a product of the multiplying.

3. The method of claim 1, wherein deranging the data in the accumulator comprises rotating the data in the accumulator by a predetermined amount and adding a first constant to a result of rotating the other data.

4. The method of claim 1, wherein the multiplication is over at least one of a field of integers, a finite field, a group, or a ring.

5. A system, comprising:
a memory;
a processing device communicably coupled to the memory;
an input device communicably coupled to the memory and the processing device, the input device to receive a first sequence of bits;
a subset generator executable from the memory by the processing device, the subset generator to produce subsets of bits from the first sequence of bits, wherein each subset comprises a same number of bits and wherein one or more of the subsets of bits of the input stream comprises an overlapping subset;
a number generator communicably coupled to the subset generator to generate a plurality of random number outputs;
a mixer executable from the memory by the processing device, the mixer to entangle a subset of the subsets of bits from the subset generator with a next sequential output of the number generator, wherein the entangling comprises multiplication of the subset by the next sequential output of the number generator; and
an accumulator executable from the memory by the processing device, the accumulator to add a product of the entanglement received from the mixer to data stored in the accumulator in order to produce updated data;
a deranger to derange current data in the accumulator, the deranging comprising augmenting the current data to be non-linear by applying functions to the current data utilizing constant values;
wherein the mixer to repeat the entangling, the accumulator to repeat the adding, and the deranger to repeat the deranging on at least a portion of a next sequential subset of the subsets of bits until all of the subsets of bits have been processed.

6. The system of claim 5, wherein the deranger to derange the data in the accumulator comprises the deranger multiplying the data in the accumulator by a first constant and adding a second constant to a product of the multiplying.

7. The system of claim 5, wherein the deranger to derange the data in the accumulator comprises the deranger rotating the data in the accumulator by a predetermined amount and adding a first constant to a result of rotating the data.

8. The system of claim 5, wherein the entangling comprises multiplication over at least one of the field of integers, a finite field, a group, or a ring.

9. A non-transitory machine-readable storage medium including instructions that, when accessed by a processing device, cause the processing device to perform operations comprising:
initializing, by a hashing module executed by the processing device, an accumulator with a non-zero value;
dividing an input stream into subsets of bits, wherein each subset comprises a same number of bits and wherein one or more of the subsets of bits of the input stream comprises an overlapping subset;
entangling, by a mixer of the hashing module, a subset of the subsets of bits by a next sequential output of a number generator, wherein the entangling comprises multiplication of the subset by the next sequential output of the number generator;
adding a product of the entangling to an accumulator of the hashing module;
deranging current data in the accumulator, the deranging comprising augmenting the current data to be non-linear by applying functions to the current data utilizing constant values;

repeating, by the hashing module, the entangling, the adding, and the deranging on at least a portion of a next sequential subset of the subsets of bits until all of the subsets of bits have been processed; and when all of the subsets of bits have been processed, returning data in the accumulator as a hash result value.

10. The non-transitory machine-readable storage medium of claim 9, wherein the deranging the data in the accumulator comprises multiplying the data in the accumulator by a first constant and adding a second constant to a product of the multiplying.

11. The non-transitory machine-readable storage medium of claim 9, wherein the deranging the data in the accumulator comprises rotating the data in the accumulator by a predetermined amount and adding a first constant to a result of rotating the other data.

12. The non-transitory machine-readable storage medium of claim 9, wherein the multiplication is over at least one of a field of integers, a finite field, a group, or a ring.

13. The method of claim 1, wherein the number generator is a pseudo-random number generator (PRNG).

14. The system of claim 5, wherein the number generator is a pseudo-random number generator (PRNG).

15. The non-transitory machine-readable storage medium of claim 9, wherein the number generator is a pseudo-random number generator (PRNG).

* * * * *